United States Patent
Zhu et al.

(10) Patent No.: US 10,425,502 B2
(45) Date of Patent: Sep. 24, 2019

(54) SYSTEM AND METHOD FOR ACQUIRING, PROCESSING AND UPDATING GLOBAL INFORMATION

(71) Applicant: Alibaba Group Holding Limited, Grand Cayman (KY)

(72) Inventors: Yunfeng Zhu, Hangzhou (CN); Yijun Lu, Hangzhou (CN); Yanchao Li, Hangzhou (CN); Jibin Lei, Hangzhou (CN); Yunfeng Tao, Hangzhou (CN); Zhiyang Tang, Hangzhou (CN); Jun Yu, Hangzhou (CN); Jia Feng, Hangzhou (CN); DongBai Guo, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 243 days.

(21) Appl. No.: 15/386,019

(22) Filed: Dec. 21, 2016

(65) Prior Publication Data
US 2017/0187840 A1    Jun. 29, 2017

(30) Foreign Application Priority Data
Dec. 29, 2015 (CN) .......................... 2015 1 1017614

(51) Int. Cl.
*H04L 29/08* (2006.01)
*G06F 16/27* (2019.01)
(Continued)

(52) U.S. Cl.
CPC ............ *H04L 67/34* (2013.01); *G06F 16/219* (2019.01); *G06F 16/2329* (2019.01);
(Continued)

(58) Field of Classification Search
CPC .......... H04L 67/34; H04L 67/42; H04L 67/06
(Continued)

(56) References Cited

U.S. PATENT DOCUMENTS 5,828,665 A   10/1998 Husak
5,893,117 A    4/1999 Wang
(Continued)

FOREIGN PATENT DOCUMENTS

| CN | 101043419 A | 9/2007 |
|----|-------------|--------|
| CN | 104519130 A | 4/2015 |
| CN | 105282045 A | 1/2016 |

OTHER PUBLICATIONS

International Preliminary Report on Patentability to corresponding International Application No. PCT/US2016/068177 dated Jul. 12, 2018 (13 pages).

(Continued)

*Primary Examiner* — Wing F Chan
*Assistant Examiner* — Leon Y Tseng
(74) *Attorney, Agent, or Firm* — James J. DeCarlo; Greenberg Traurig, LLP

(57) ABSTRACT

A system, apparatus, and method for maintaining the consistency of global information is disclosed herein. The method includes storing historical version information associated with global information; retrieving current version information associated with the global information from a global information server; generating updated historical version information based on the current version information; transmitting an update confirmation notice to the global information server; and retrieving updated global information from the global information server based on the updated historical version information.

20 Claims, 14 Drawing Sheets

(51) Int. Cl.
  *G06F 16/21* (2019.01)
  *G06F 16/23* (2019.01)
  *H04L 29/06* (2006.01)

(52) U.S. Cl.
  CPC .............. *G06F 16/27* (2019.01); *H04L 67/06* (2013.01); *H04L 67/10* (2013.01); *H04L 67/42* (2013.01)

(58) Field of Classification Search
  USPC ........................................................ 709/219
  See application file for complete search history.

(56) References Cited

U.S. PATENT DOCUMENTS

| | | |
|---|---|---|
| 6,192,398 B1 | 2/2001 | Hunt |
| 6,910,148 B1 | 6/2005 | Ho et al. |
| 6,950,820 B2 | 9/2005 | Bae |
| 7,710,934 B2 | 5/2010 | Cho et al. |
| 7,870,226 B2 | 1/2011 | Anna et al. |
| 7,958,092 B2 | 6/2011 | Werner et al. |
| 8,141,156 B1 | 3/2012 | Mao et al. |
| 8,151,062 B2 | 4/2012 | Krishnaprasad et al. |
| 8,352,634 B2 | 1/2013 | Shen et al. |
| 9,374,310 B2 | 6/2016 | Natarajan et al. |
| 2002/0131075 A1 | 9/2002 | Kremer |
| 2002/0161917 A1 | 10/2002 | Shapiro et al. |
| 2003/0051236 A1 | 3/2003 | Pace et al. |
| 2003/0067924 A1 | 4/2003 | Choe et al. |
| 2004/0205569 A1 | 10/2004 | McCarty et al. |
| 2005/0182498 A1 | 8/2005 | Landou et al. |
| 2005/0265346 A1 | 12/2005 | Ho et al. |
| 2006/0106940 A1 | 5/2006 | Jagannathan et al. |
| 2006/0136513 A1 | 6/2006 | Ngo et al. |
| 2007/0226269 A1 | 9/2007 | Anna et al. |
| 2008/0021866 A1 | 1/2008 | Hinton et al. |
| 2008/0086737 A1 | 4/2008 | Bae et al. |
| 2008/0259844 A1 | 10/2008 | Richeson et al. |
| 2010/0076831 A1 | 3/2010 | Samuel |
| 2010/0076931 A1 | 3/2010 | Bomhoevd et al. |
| 2010/0235509 A1 | 9/2010 | Xia |
| 2011/0135275 A1 | 6/2011 | Katsuo et al. |
| 2012/0143903 A1 | 7/2012 | Scully et al. |
| 2013/0047122 A1 | 2/2013 | Ijas et al. |
| 2013/0066866 A1 | 3/2013 | Chan et al. |
| 2014/0189484 A1 | 7/2014 | Fountenberry |
| 2015/0347326 A1 | 12/2015 | Pandya et al. |
| 2016/0337264 A1 | 11/2016 | Murashko et al. |

OTHER PUBLICATIONS

International Search Report and Written Opinion to corresponding International Application No. PCT/US2016/068175 dated Mar. 10, 2017 (11 pages).
International Search Report and Written Opinion to International Application No. PCT/US2016/068618 dated Mar. 16, 2017 (14 pages).
International Search Report and Written Opinion dated Mar. 10, 2017 to corresponding International Application No. PCT/US2016/068177.
International Preliminary Report on Patentability to International Application No. PCT/US2016/068175 dated Jul. 12, 2018 (10 pages).
International Preliminary Report on Patentability to International Application No. PCT/US2016/06818 dated Jul. 12, 2018 (13 pages).

SYSTEM AND METHOD FOR ACQUIRING, PROCESSING AND UPDATING GLOBAL INFORMATION

CROSS-REFERENCE TO RELATED APPLICATIONS

This application claims the benefit of priority from Chinese Patent Application No. 201511017614.1, filed on Dec. 29, 2015 entitled, "Method, Apparatus and System for Global Information Acquisition, Processing and Updating," which is incorporated herein by reference in its entirety.

BACKGROUND

Field of the Disclosure

The disclosure relates to the field of Internet technologies, and in particular, to a system and method for acquiring, processing, and updating global information.

Description of the Related Art

With the rapid development of e-commerce globalization, cross-regional e-commerce transactions are becoming increasingly popular and frequent.

Services deployed in a large-scale cross-regional distributed e-commerce scenario generally face global information update requirements. The update process must be efficient and information must be kept globally consistent, all the while maintaining continuous services.

Consider, as examples, IP address translation configuration data in a Virtual Private Cloud (VPC) service or global information of an international e-commerce platform such as eBay, Amazon, etc.

By using a routing table, in the process of performing an e-commerce transaction, user data operations at an Internet Data Center (IDC) may be involved. In order to quickly respond to a user's data operation requests and guarantee consistency of global information, international e-commerce platforms such as Alibaba, Amazon and eBay may allocate several IDCs in multiple regions in a distributed manner, assign the nearest IDC according to the location of the user, record the IDC to which the user belongs into the routing table, and fulfill a user's data operation request based on the routing table. In this manner, the platforms may serve users in various regions and ensure that all data operations of a user are directed to the appropriate IDC.

In practice, however, users may perform cross-regional data operations. For example, a user may travel to another city on business or may immigrate to another country. To quickly respond to a user's data operation requests and ensure global data consistency, the platforms must re-assign the IDC associated with the user and update the routing table.

Current techniques for updating a routing table involve the use of a management control system (MCS) of the e-commerce platform which pushes an updated new version routing table to application servers in various regions. The application server, after receiving the new version of the routing table, correspondingly returns an update confirmation notice to the MCS and suspends serving a user's data operation request. After acknowledging that all application servers in the regions have received the new version routing table, the MCS sends a routing table enabling instruction to the application servers. The application servers then resume normal services after receiving the enable instruction. Thus, the application servers in different regions serve users by using the unified routing table, ensuring consistency of the global data.

However, using the above technique, application servers spend a significant amount of time acquiring a completely new version of the routing table (which, itself, contains a large amount of data). Due to large differences in environmental conditions, such as network links and physical distances (e.g., from the MCS to the application servers in the regions), it is common that application servers in some regions may have received the new version of the routing table, while application servers in other regions are still in the process of receiving the new version of the routing table. Therefore, it takes a significant amount of time for the all the application servers to complete the routing table update. Moreover, to ensure global consistency of the routing table, during the entire process of updating the routing table, all of the application servers are unable to serve the users. While described primarily in the context of a routing table update, in other large-scale cross-regional update scenarios of global information, the problems of low update efficiency and prolonged service unavailability still exist.

Therefore, as described above, current techniques for updating global information are inefficient and cause numerous problems resulting in services being unavailable for a significant amount of time during the updating of global information.

BRIEF SUMMARY

In view of the above problems, embodiments of the disclosure are proposed to provide a global information acquiring method and device, a global information processing method and device, and a global information updating method, device and system that can overcome the above problems or at least partially overcome the above problems.

According to one embodiment, the disclosure describes a method for maintaining the consistency of global information. The method includes storing historical version information associated with global information; retrieving current version information associated with the global information from a global information server; generating updated historical version information based on the current version information; transmitting an update confirmation notice to the global information server; and retrieving updated global information from the global information server based on the updated historical version information.

According to one embodiment, the disclosure describes an apparatus for maintaining the consistency of global information. The apparatus includes a processor and a non-transitory memory storing computer-executable instructions. The instructions, when executed by the processor, cause the apparatus to: store historical version information associated with global information; retrieve current version information associated with the global information from a global information server; generate updated historical version information based on the current version information; transmit an update confirmation notice to the global information server; and retrieve updated global information from the global information server based on the updated historical version information.

According to one embodiment, the disclosure describes a system for maintaining the consistency of global information. The system includes a global information server configured to: store global information and version information associated with the global information; transmit the version information to one or more application servers; receive an update confirmation notice from the one or more application servers; receive a global information acquiring request from the one or more application servers, the global information acquiring request including version information; transmit global information to the one or more application servers in response to the global information acquiring request. The system also includes an application server configured to: store historical version information associated with global information; retrieve current version information associated with the global information from a global information server; generate updated historical version information based on the current version information; transmit an update confirmation notice to the global information server; and retrieve updated global information from the global information server based on the updated historical version information.

The embodiments of the disclosure have the following advantages.

Compared with the current technique of acquiring a piece of complete global information having a large amount of data and correspondingly returning an update confirmation notice, the application server in some embodiments can return an update confirmation notice after acquiring version information having a smaller amount of data, and acquire corresponding global information from the global information server according to the updated version information. The global information server separately receives global information of various versions pushed by the global information update management control device. By decoupling the global information from a version information update process, and even though there are differences between various conditions such as network links and physical distances, the differences in time consumed by the application servers to acquire the version information are relatively small; therefore, an update of the global version information may be implemented within a short period of time.

At the same time, by introducing the transitional global information and the corresponding transitional version information, the global system service unavailability is greatly compressed, and the update efficiency of the global information is greatly improved, thereby avoiding the problem that the service of the global system is unavailable for a significant amount of time during updating.

Moreover, a confirmation of a communication status is maintained between the application server and the global information server, and the application server is stopped from providing service when the communication status is abnormal, thereby avoiding the situation that the application server uses expired global information to cause inconsistency in global data.

Further, if the embodiments of the disclosure are applied to an update scenario of a global routing table, compared with the current routing table updating manner in which the application server needs to acquire a complete routing table having a large amount of data. In some embodiments, by decoupling the routing table from version information of the routing table, the application server only needs to acquire the version information having a small amount of data, and acquires the currently required routing data specifically from the global information server by using the version information, thereby meeting a user's service requirement, and improving the efficiency of updating the global routing table.

In addition, there are a large number of application servers, and in the current routing table global updating method, the simultaneous acquisition of the routing table by the large number of application servers may cause occupation on the bandwidth. However, according to the embodiments of the disclosure, only a small number of global information servers are used to acquire a routing table of a new version, and the application server only needs to acquire currently required routing data from the routing table of the new version specifically, thereby reducing the occupation on the bandwidth.

Moreover, by introducing the transitional version information of the routing table and the transitional version routing table provided with the stop-write identification, an update process of the routing table is divided into two steps. First, the version information of a historical version is updated to the transitional version information, and after the update of the transitional version information is completed, it is updated to the new version information. The updating manner may ensure the global consistency of routing table data when the application servers receive the version information at different times without the need of fully suspending the service.

DETAILED DESCRIPTION

To make the above objectives, features and advantages of the disclosure more apparent and comprehensible, the disclosure is further described in detail through the accompanying drawings and specific implementation manners.

Figure 1:
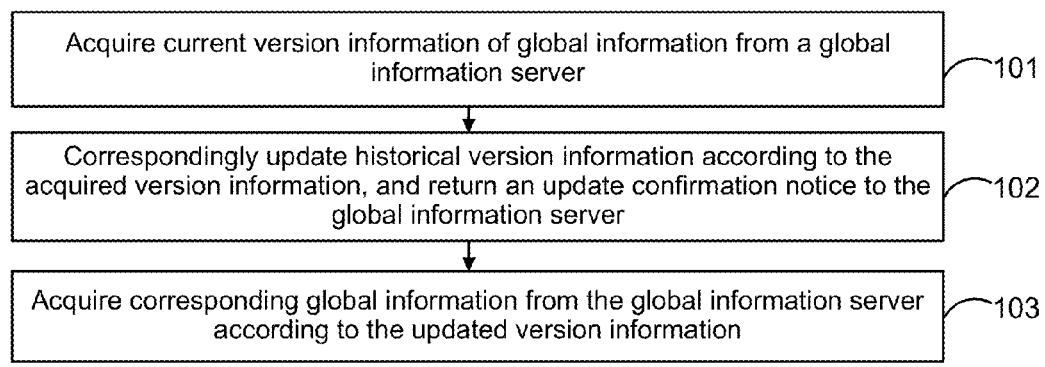
FIG. 1 is a flow diagram illustrating a method for acquiring global information, according to some embodiments of the disclosure.

FIG. 1 is a flow diagram illustrating a method for acquiring global information, according to some embodiments of the disclosure. In one embodiment, the method illustrated in FIG. 1 may be executed by an application server.

In step 101, the method acquires current version information of global information from a global information server. It should be noted that, the global information may be IP address translation configuration data in a VPC service, a global routing table, or any information that needs to be updated globally to ensure global data consistency. Persons skilled in the art can apply the methods described herein to various types of global information according to actual needs and according to the techniques provided in the disclosure.

In one embodiment, a global information updating system of an e-commerce platform may include a global information update management control device, a global information server, and one or more application servers. The global information update management control device is responsible for coordinating a global information update process, specifically the global information update management control device pushes updated global information and corresponding version information to global information servers in multiple regions, and/or pushes the updated global information to the global information servers in multiple regions, and then correspondingly modifies version information of the global information servers. It should be noted that the process of transmitting global information, having a large amount of data, takes a significant amount of time. Therefore, the global information update management control device may only push the global information to the global information servers, and may not trigger an update and upgrade of the global information. After the global information update management control device pushes the version information, which has a small amount of data, to the global information server, a global update and upgrade may be triggered. In some embodiments, the global information update management control device may be a management control system (MCS).

A global information server may be deployed in the region of an application server. In one embodiment, the global information server may respectively be provided with a global information cache system and a version information management system. The global information cache system may cache global information of various versions pushed by the global information update management control device. The version information management system may cache version information of the global information of various versions pushed by the global information update management control device, or receive modifications to the global information update management control device on the version information stored therein. Moreover, the version information management system is further responsible for coordinating the version information update process of the global information of each application server in the region, so as to maintain data consistency of the global information.

Certainly, persons skilled in the art may implement the global information cache system and the version information management system on two servers, that is, each region is respectively provided with the global information cache server and the version information management server. The global information cache server is responsible for caching the global information pushed by the global information update management control device. The version information management server is responsible for storing the version information of the global information of various versions and coordinating the version information update process of each application server in the region. In one embodiment, the global information, which has a large amount of data and takes a significant amount of time for transmission, is pushed to the global information cache server in advance.

After completing the pushing of global information, the updating of the version information management server on the version information recorded by each application server in the region is triggered, thereby implementing separation of the global information and the version information.

The application servers may be application servers corresponding to various types of application programs on the e-commerce platform, in which new version information of the global information is subscribed from the version information management system of the global information server in the region. In this manner, the new version information pushed by the global information update management control device to the global information server or modifications of the version information is detected and the new version information of the global information from the global information server is acquired.

In one embodiment, before step 101, the version information of the global information in the global information server is subscribed to. When a version information update notification sent by the global information server is received, the current version information of the global information is downloaded from the global information server. By subscribing to the global information server, it is advantageous for the application server to acquire the required updated global information in time, thereby improving the update efficiency of the global information.

In step 102, the method correspondingly updates historical version information according to the acquired version information and returns an update confirmation notice to the global information server.

In one embodiment, the application server acquires version information of the current global information from the global information server, and updates originally recorded historical version information in the application server according to the acquired version information. After the update is completed, the update confirmation notice may be returned to the global information server. In response, the global information server collects the update confirmation notice and returns the update confirmation notice to the global information update management control device.

In step 103, the method acquires corresponding global information from the global information server according to the updated version information.

The application server acquires, according to the updated version information thereof, global information corresponding to the version information from the global information server, so as to acquire the updated global information. In one embodiment, the global information of a complete new version may be acquired. Alternatively, only the part of the updated global information may be acquired.

Compared with existing techniques wherein an application server acquires complete global information (having a large amount of data) and correspondingly returning an update confirmation notice, the application server in some embodiments may return an update confirmation notice after acquiring version information having a smaller amount of data and acquire corresponding global information from the global information server according to the updated version information. The global information server separately receives global information of various versions pushed by the global information update management control device. By decoupling global information from the version information update process, and even though there are differences between various conditions such as network links and physical distances, the differences in time consumed by the application servers to acquire the version information are relatively small. Therefore, an update of the global version information may be implemented within a short period of time.

To facilitate persons skilled in the art to understand the embodiments of the disclosure, further explanation and illustration are given below by using a routing table as the global information. Using the example of updating a global routing table, the method may analyze, according to user access records on a cross-regional e-commerce platform, the region in which a user uses the e-commerce platform within a period of time, thereby determining a region to which the user actually belongs (and a corresponding IDC). When the IDC to which the user actually belongs is inconsistent with the record in the historical version of global information, the routing data of the global information must be updated and the method may generate an update request to update the global information.

The application servers may be application servers corresponding to various types of application programs or services on the e-commerce platform. In response to a service acquiring request submitted by the user, the application server extracts a user identification from the service acquiring request and queries the global information server to determine which IDC the user belongs according to the user identification and version information of the currently used global information recorded in the application server itself, so as to access the IDC to acquire a related data service.

The application server may acquire the current version information of the routing table from the global information server, update original historical version information according to the acquired version information, and return the update confirmation notice to the global information server of the region.

Subsequently, the user may submit a service acquiring request via an application program provided by the e-commerce platform, and the service acquiring request may include one or more data operations to be performed by the application server at the IDC, such as creating, deleting, or modifying data stored in a database at the IDC. The e-commerce platform may send the service acquiring request to the application server for processing.

After receiving the service acquiring request, the application server may extract user identification from the service acquiring request, generate a routing data acquiring request by means of the user identification in combination with the updated version information, and send the routing data acquiring request to the global information server. The global information server may identify global information based on the version information included within the service acquiring request, search the global information for routing data corresponding to the user identification, and return the identified routing data to the application server.

The routing data may indicate which IDC is assigned to user. That is, the IDC that should be accessed by the application server in response to the user's request. Therefore, the application server accesses the corresponding IDC according to the indication of the routing data, and performs related data operation on data of the user in the appropriate IDC according to the service acquiring request, meeting the service requirements of the user.

It can be seen that, if the embodiments of the disclosure are applied to an update scenario of a global routing table, compared with current techniques, in some embodiments, by decoupling the routing table from version information of the routing table, the application server only needs to acquire the version information having a small amount of data, and acquires the currently required routing data from the global information server by using the version information, thereby meeting a user's service requirement, and improving the efficiency of updating the global routing table.

In addition, there may be a large number of application servers, and according to current techniques, the simultaneous acquisition of the routing table by the large number of application servers may cause network congestion. However, according to the embodiments of the disclosure, only a small number of global information servers are used to acquire a routing table of a new version, and the application server only needs to acquire currently required routing data from the routing table of the new version specifically, thereby reducing network congestion.

Moreover, by introducing transitional version information of the routing table (including "stop-write" identifications), the updating of the routing table is divided into two steps. First, the historical version information is updated to the transitional version information, and after the update of the transitional version information is completed, it is updated to new version information. This process may ensure the global consistency of routing table data when the application servers receive the version information at different times without the need of fully suspending the service. The use of transitional version information is described in more detail with respect to FIG. 2.

Figure 2:
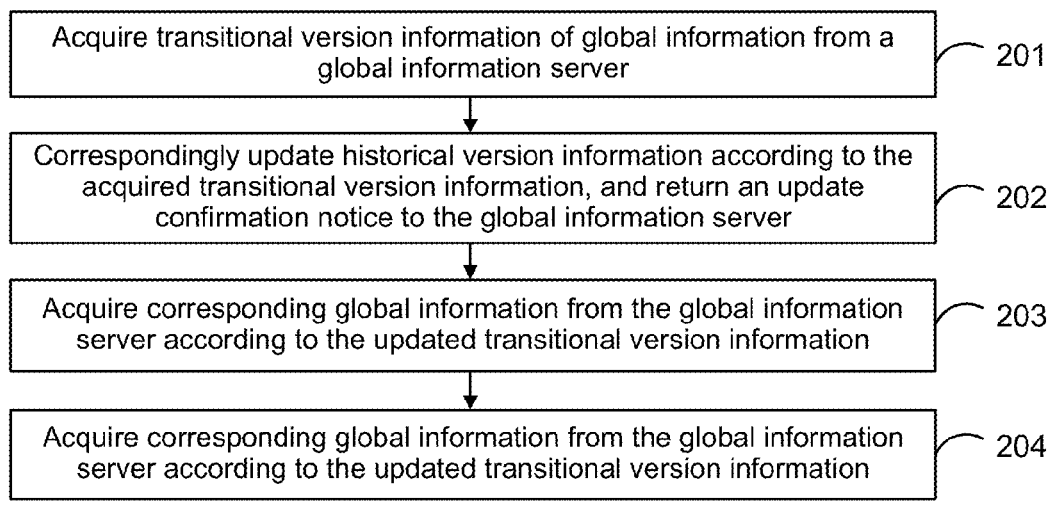
FIG. 2 is a flow diagram a method for acquiring global information, according to some embodiments of the disclosure.

FIG. 2 is a flow diagram a method for acquiring global information, according to some embodiments of the disclosure. In one embodiment, the method illustrated in FIG. 2 may be performed by an application server.

In step 201, the method acquires transitional version information of global information from a global information server.

In step 202, the method correspondingly updates historical version information according to the acquired transitional version information and returns an update confirmation notice to the global information server. In one embodiment, historical version information comprises version information stored by an application server prior to performing step 201.

In step 203, the method acquires corresponding global information from the global information server according to the updated transitional version information.

In step 204, the method determines whether the acquired global information includes a stop-write identification, and if so, suspends a service provided for the global information.

It should be noted that, in the global information update system of an e-commerce platform, variations in environmental conditions such as network links and physical distances (e.g., from the global information server to various application servers in the region) are large. Thus, it is possible that some application servers may receive new version information, while some application servers are still in the process of receiving the new version information. Moreover, regardless of how ideal external conditions are, the application servers cannot be completely ensured to receive the new version information at the same time, and if the application servers provide services by using global information of different versions, global data inconsistency may result. To ensure global data consistency, uniform global information must be used globally; therefore, some application servers that have acquired the new version information need to be in a waiting status and cannot serve users continuously, thereby affecting user experiences of the e-commerce platform.

To solve the above technical problem, a transitional version of global information may be inserted between updating the historical version of global information to the new version of global information.

In some situations, not all global information is updated, and therefore, some services involved in the updated global information may be suspended, and other global information may be continuously used for serving users.

The global information update management control device may add a stop-write identification for global information that has changed or will be changed and the stop-write identification is used to suspend services related to the global information. The global information update management control device may push the transitional version of global information and the corresponding transitional version information to the global information server. The application servers may acquire the transitional version information by subscribing to the global information servers, update the historical version information by using the transitional version information, and return the update confirmation notice to the global information servers.

After updating the historical version information to the transitional version information, the application server acquires corresponding transitional version of global information from the global information server according to the transitional version information. The application server analyzes the acquired global information and when the global information includes a stop-write identification, suspends services related to the global information including the stop-write identification. Therefore, during the update process of global information, even though the historical version information and the transitional version information, or the transitional version information and the new version information coexist in the global application server, global data consistency will not be affected, and the affected user services are only limited to the user services involving global information to be updated in the transitional global information. Therefore, the transitional version information is introduced when the historical version information is updated to the new version information. The historical version is first updated to the transitional version, and the transitional version is then updated to the new version. Both of the two update processes can ensure global data consistency, while reducing the effect of the update process on user services, thereby keeping the continuity of services, and avoiding the problems that user services need to be completely suspended during a global information update process and the user experience is negatively impacted.

According to the embodiments of the disclosure, by inserting the transitional version of global information in the process of updating the historical version of global information to the new version of global information, the application server acquires the global information according to the transitional version information, and only when the global information including the stop-write identification is acquired must some services be suspended. The global system service unavailability is greatly reduced, thereby avoiding the problem that the service of the global system is unavailable for a significant amount of time during updating. Further, the continuity of the e-commerce platform service is improved and negative influences on user during global information update are reduced, all the while ensuring global data consistency.

When the global information is a routing table, the current version information of the routing table may be acquired from the global information server, historical version information is updated according to the acquired version information, and the update confirmation notice is returned to the global information server. After the service acquiring request submitted by the user is received, corresponding routing data is acquired from the global information server according to the updated transitional version information. It is determined whether the acquired routing data includes the stop-write identification, and if so, a prompt notification of rejecting the service acquiring request is returned to the user.

This is because, in some embodiments, not all IDCs to which the users belong may change. Therefore, the global information update management control device may add the stop-write identification to routing data which has changed or will be changed in the global information, and the stop-write identification is used to suspend an operation of the user that may cause global data inconsistency such as writing data into the IDC to which the user actually belongs or originally belongs.

Figure 10:
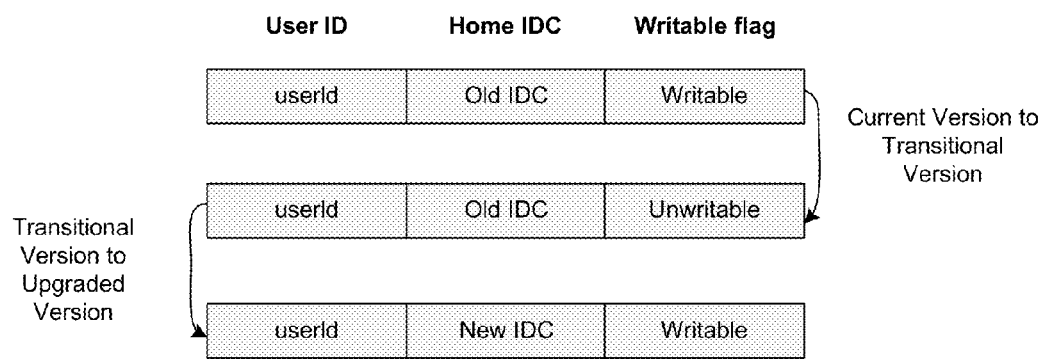
FIG. 10 is a diagram of version update process for a routing table, according to some embodiments of the disclosure.

FIG. 10 is a diagram of version update process for a routing table, according to some embodiments of the disclosure.

In the routing table of a transitional version, each piece of routing data may include a user ID, a home IDC for each user ID, and a flag indicating whether the user is writable for its home IDC.

In the illustrated embodiment, regarding routing data, it may be determined whether the routing data includes a stop-write identification, and if the routing data includes the stop-write identification, it indicates that the region where the user is located has changed, and the IDC to which the user actually belongs is inconsistent with the IDC to which the user originally belonged. If the user is allowed to continuously access the IDC to which the user originally belonged, it may result in global data inconsistency after the user writes data in the IDC to which the user originally belongs. Therefore, a prompt notification of rejecting the service acquiring request submitted by the user may be returned to the user, so as to temporarily deny the user from accessing the IDC to which the user originally belongs.

After acquiring the transitional version information, the application server may immediately continue serving the users. Only when the routing data including the stop-write identification is acquired from the global information server, must the application server deny the user from accessing the IDC to which the user actually belongs or originally belongs. That is, only some services of some users need to be suspended when the application server uses the transitional version information, which does not affect other users.

Figure 3:
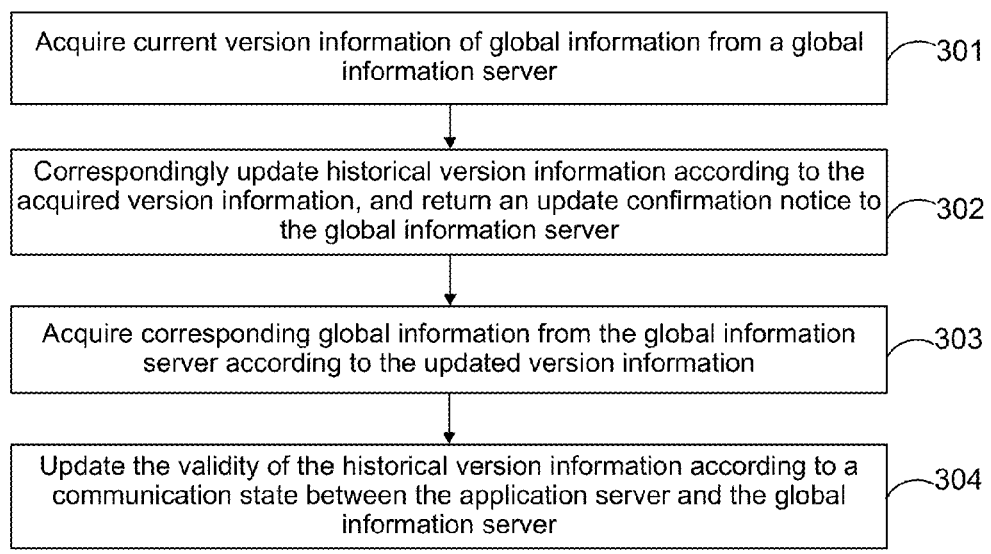
FIG. 3 is a flow diagram of a method for acquiring global information, according to some embodiments of the disclosure.

FIG. 3 is a flow diagram of a method for acquiring global information, according to some embodiments of the disclosure. In one embodiment, the method illustrated in FIG. 3 may be performed by an application server.

In step 301, the method acquires current version information of global information from a global information server.

In step 302, the method correspondingly updates historical version information according to the acquired version information and returns an update confirmation notice to the global information server.

In step 303, the method acquires corresponding global information from the global information server according to the updated version information.

In step 304, the method updates the validity of the historical version information according to a communication status between the application server and the global information server.

It should be noted that, in some embodiments, due to reasons such as network abnormality or an "apparent death" of the update process, the large number of application servers on a cross-regional e-commerce platform may cause the global information update management control device to omit some of the application servers when acknowledging update statuses of version information of the application servers through the global information server, consider, by mistake, all application servers have acquired the updated version information, and initiate an instruction of enabling new version of global information to the application servers. Some application servers miss the update of the version information due to the network abnormality or the apparent death of the update process, wherein this portion of application servers do not know that the used version information has expired, and serve users by continuously using the historical version information, ultimately resulting in global data inconsistency.

To solve the above technical problem, the embodiments of the disclosure provide a global information version information distributed coordinating management mechanism based on validity.

In one embodiment, a communication status between the application status and the global information server may be determined first, and when the communication status is normal, the validity of the historical version information being used may be reset, wherein the historical version information may be used normally in this validity period to serve the users. When the communication status is abnormal, for example, the application server cannot connect to the global information server within a period of time, it is determined that the historical version information expires, this is because in this period of time, there may be an update for new version of global information, and if the historical version information is continuously used to serve the users, it may result in global data inconsistency. Therefore, it is necessary to suspend the use of the historical version information to serve the users.

Persons skilled in the art may determine the communication status in various manners, for example, by sending heartbeat packages between devices. Persons skilled in the art may also determine the validity of the version information according to actual situations, for example, the application server and the global information server automatically negotiate to determine the validity.

In one embodiment, step 304 may include the following sub-steps.

In sub-step S11, the method may send first communication status confirmation information to the global information server regularly.

In sub-step S12, the method may reset the validity of the version information when receiving confirmation information of a second communication status returned by the global information server within a preset period of time.

In sub-step S13, the method may determine that the version information is invalid and suspend the service provided for the global information, when confirmation information of a second communication status returned by the global information server is not received within a preset period of time.

In one embodiment, the application server may send the first communication status confirmation information to the global information server regularly, and if the communication status is normal, the global information server may receive the first communication status confirmation information within the preset time period and correspondingly return confirmation information of a second communication status. When the application server receives the confirmation information of a second communication status, it indicates that the status of communication with the global information server is currently normal, and the validity of the version information of the currently used global information may be reset. Service acquiring requests of the users may then be processed by continuously using the version information.

When the confirmation information of a second communication status returned by the global information server is not received within the preset time period, it indicates that the communication with it is abnormal, and it may be necessary to update the version information of the global information within this time period. Based on this uncertainty, the application server may determine that the current version information is invalid, and to no longer use it to serve the users, so as to ensure global data consistency.

One non-limiting example of a global information version information distributed coordinating management mechanism based on validity is explained in detail below.

The application server may be used as a client in the global information version information distributed coordinating management mechanism, and the global information server is used as a server therein. A session is used between the client and the server to indicate the validity of a connection status between the devices. When the client registers a session to the server, it designates a client session timeout, and the server may calculate a corresponding server session timeout accordingly. The client and the server acknowledge the validity of the session through heartbeats, and if one end does not receive a heartbeat reply from the other end within the session timeout time, it may actively determine that the session is expired.

The session timeout negotiated by the client and the server can ensure that when the server determines that a certain session is expired according to the server session timeout, correspondingly, the client may also determine in advance whether a certain session is expired according to its client session timeout (CST).

Figure 11:
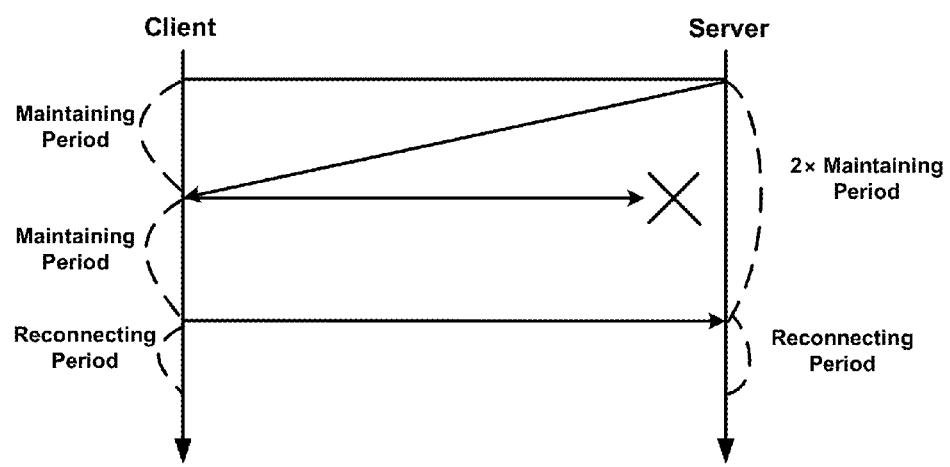
FIG. 11 illustrates a session timeout method, according to some embodiments of the disclosure.

FIG. 11 illustrates a session timeout method, according to some embodiments of the disclosure.

The session timeout of the client is divided into a maintaining period (MP) for determining that the session is normal, and a reconnecting period (RP) for reconnecting to the server after a connection abnormality is found. In a non-ideal condition, the server receives the heartbeat package sent by the client immediately, and does not receive a heartbeat reply after the second MP ends, it may be determined that the connection status between the client and the server is abnormal, the RP stage of reconnecting another server is entered, and at the same time, it is determined that the session is expired. In this case, the server waiting for the heartbeat package also needs to determine that the session is expired. Therefore, the client session timeout may be set as MP+RP, and the server session timeout is at least MP×2+RP or CST×2, so that the negotiated session timeout may enable the client and the server to have consistent determination on the expiration of the session.

For the global information version information distributed coordinating management mechanism, each application server may determine the client session timeout based on a lease value representing the validity of the associated data, so as to register the session to the global information server in the region.

Figure 12:
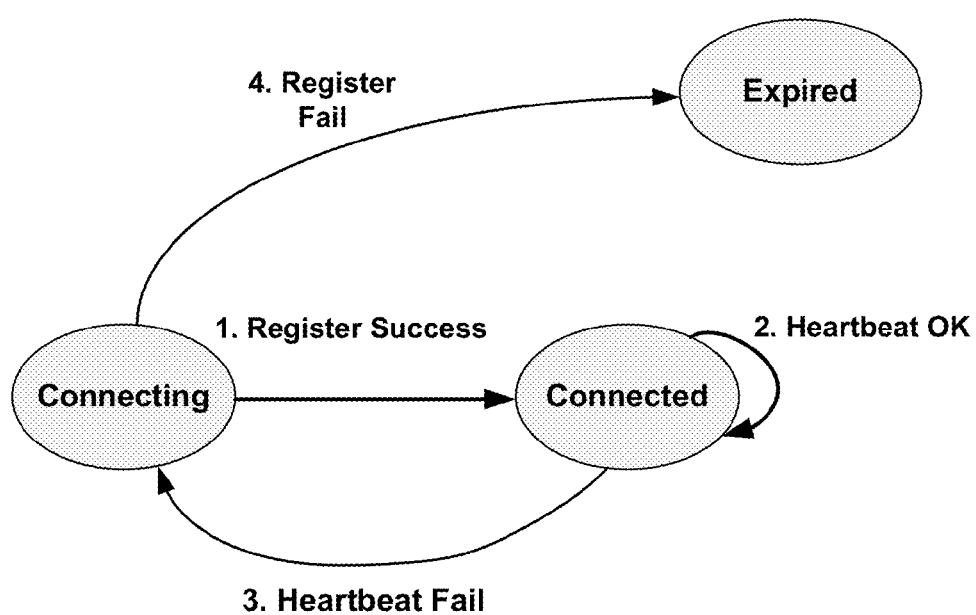
FIG. 12 illustrates a method for registering a session according to some embodiments of the disclosure.

FIG. 12 illustrates a method for registering a session according to some embodiments of the disclosure.

After successfully registering the session, the application server may enter a "Connected" status, and start a lease validity period associated with the version information of the local global information. Then, the application server and the version information management system of the global information server of the region maintain periodical heartbeat confirmation with each other, and reset the lease validity period corresponding to the local version information according to the heartbeat reply. If the application server does not receive the heartbeat reply, it may return to a "Connecting" status, and try to register the session again. If the registration fails within the CST, it may be determined that the session is expired, that is, the lease validity corresponding to the version information of the local global information is invalid, and all operations related to the version information are rejected, thereby maintaining global data consistency.

According to the embodiments of the disclosure, on the basis of decoupling the global information from the version information, the validity of the historical version information is updated according to the communication status between the application server and the global information server, wherein the application server stops providing services when the communication status is abnormal, thereby avoiding the problem of global data inconsistency of the application server caused by reasons such as network abnormality or "apparent death" of the update process.

Figure 4:
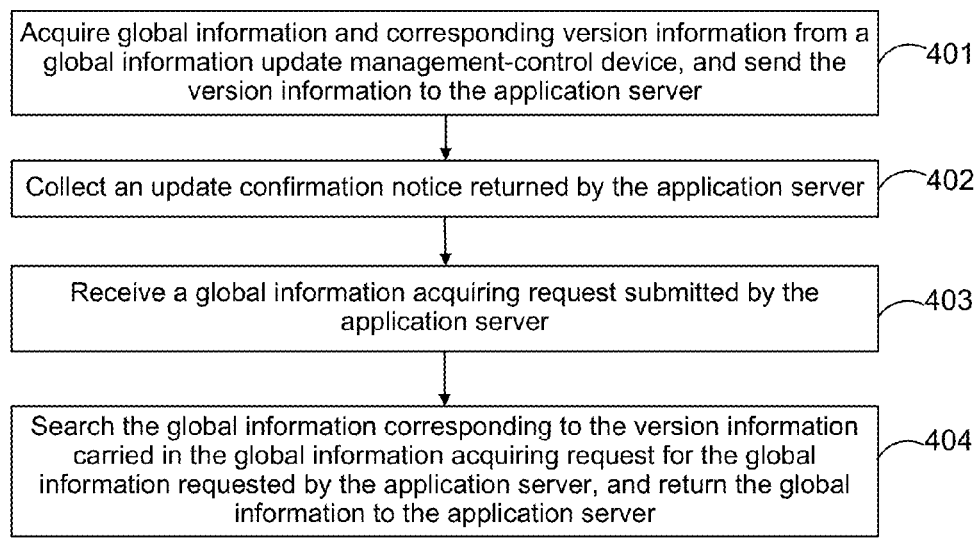
FIG. 4 is a flow diagram illustrating a method for processing global information according to some embodiments of the disclosure.

FIG. 4 is a flow diagram illustrating a method for processing global information according to some embodiments of the disclosure. In one embodiment, the method illustrated in FIG. 4 may be performed by a global information server.

In step 401, the method acquires global information and corresponding version information from a global information update management control device and sends the version information to an application server.

In step 402, the method receives an update confirmation notice returned by the application server.

In an e-commerce platform global information update system according to the embodiments of the disclosure, the global information server acquires global information of a new version and corresponding version information from the global information update management control device.

In one embodiment, the global information server may be respectively provided with a global information cache system and a version information management system. The global information cache system may store global information of various versions. The version information management system may store version information of the global information of various versions acquired by the global information update management control device, or the version information management system may receive modifications of the global information update management control device on the version information stored therein. The global information server may also independently generate corresponding version information according to the acquired global information. In some embodiments, persons skilled in the art may also implement the global information cache system and the version information management system respectively on two servers, that is, a distributed cache server and a distributed coordinating server are implemented separately, the distributed cache server is responsible for caching the global information pushed by the global information update management control device, and the distributed coordinating server is responsible for coordinating the update process of the version information of the global information of each application server in the region.

The version information of the new version of global information may be sent to the application server in the region. The application server updates its original historical version information according to the version information of the new version of global information, and returns an update confirmation notice. The global information server collects the update confirmation notices of the version information of the global information from multiple application servers of the region, so as to relay the update status of the version information of the region to the global information update management control device.

In step 403, the method receives a global information acquiring request submitted by the application server.

In step 404, the method searches for global information requested by the application server corresponding to version information included in the global information acquiring request and returns the global information to the application server.

The application server may submit a global information acquiring request including the current version information to the global information server according to requirements thereof and, after receiving the global information acquiring request, the global information server may search for the global information of the corresponding version according to the version information included in the request, and return the found global information to the application server.

When the global information is a routing table, after receiving the service acquiring request submitted by the user, the application server may extract a user identification from the service acquiring request, generate a routing data acquiring request by means of the user identification in combination with the updated version information thereof, and send the routing data acquiring request to the global information server. The global information server may find global information of a corresponding version according to the version information therein, search the global information for routing data corresponding to the user identification, and return the found routing data to the application server, so that the application server may access a corresponding IDC.

In some embodiments, by decoupling the global information from the version information of the global information, the global information server only needs to send the version information to the application server, search for corresponding routing data from the global information by using the version information, and return the corresponding routing data, so as to meet service requirements of the users, therefore, even with the differences between various conditions such as network links and physical distances, a time difference of application servers acquiring the version information is relatively small; therefore, an update of the global version information may be implemented within a short time period, thereby improving the update efficiency of the global information, and avoiding the problem that the global system services are unavailable for a significant amount of time during updating.

Figure 5:
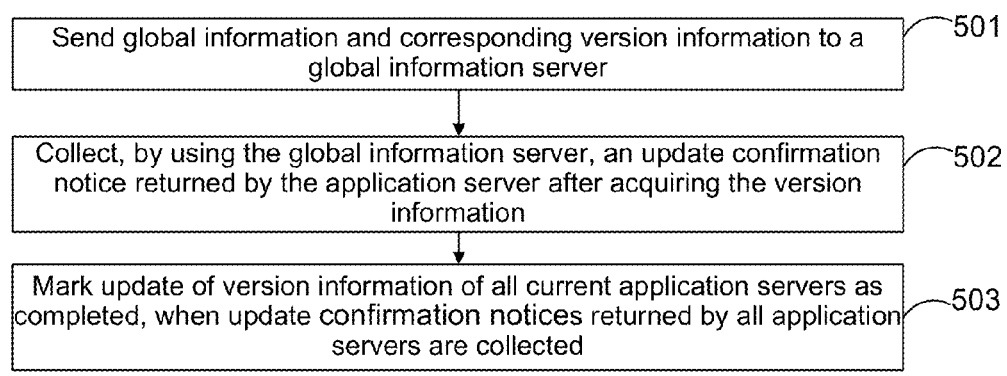
FIG. 5 is a flow diagram of a method for updating global information, according to some embodiments of the disclosure.

FIG. 5 is a flow diagram of a method for updating global information, according to some embodiments of the disclosure. In one embodiment, the method illustrated in FIG. 3 may be performed by a global information update management control device.

In step 501, the method sends global information and corresponding version information to a global information server.

It should be noted that, in the global information update system of the e-commerce platform, the global information update management control device is responsible for coordinating the global update process of the global information, and may acknowledge, according to the collected update confirmation notice, whether it is globally enabling the new version of global information and deliver a corresponding instruction.

The global information update management control device may generate global information of a new version and corresponding version information according to the updated global information, and push them to global information servers in various regions.

In one embodiment, step 501 may include the following sub-steps.

In sub-step S21, the method may send the global information and the corresponding version information to a global information cache system and a version information management system of the global information server.

In one embodiment, the global information server may respectively be provided with a global information cache system and a version information management system. The global information cache system may cache the global information of various versions pushed by the global information update management control device, and the version information management system may cache the version information of the global information of various versions pushed by the global information update management control device. Therefore, the global information update management control device may respectively send the global information and the version information corresponding to the two systems, and certainly, persons skilled in the art may send the global information to the global information cache system a period of time in advance according to actual requirements, and send the version information the version information management system after the sending of the global information is completed, so that the global information and the version information are separated.

In step 502, the method collects an update confirmation notice returned by the application server after acquiring the version information through the global information server.

In one embodiment, the global information server may collect the update confirmation notices returned by the application servers, the global information update management control device uniformly collects the update confirmation notice from the global information server, or the global information update management control device subscribes to the collection situation of the global information server on the update confirmation notices. Alternatively, the global information server may generate, according to the collected update confirmation notices, an update confirmation notice summary and relay the summary to the global information update management control device. Persons skilled in the art may use other update confirmation collecting means according to actual needs.

Compared with current techniques, in the collecting method of the update confirmation notices in the disclosed embodiments, the global information update management control device only needs to perform information interaction with a small number of global information servers to know the global update status of the global information, thereby saving processing resources of the global information update management control device.

In step 503, the method marks the update of version information of all the current application servers as completed when update confirmation notices returned by all the application servers are collected.

The global information update management control device collects the update confirmation notices of all the application servers through the global information server, it may indicate that the global application servers are ready for enabling the new version of global information, and the completion of the update of the current version information of the global application servers may be used to indicate globally enabling the new version of global information.

The application server in some embodiments may return an update confirmation notice after acquiring version information having a smaller amount of data, and acquire corresponding global information from the global information server according to the updated version information. By decoupling the global information from the version information, even with the differences between various conditions such as network links and physical distances, a time difference of application servers acquiring the version information is relatively small; and therefore, an update of the global version information may be implemented within a short time period, thereby improving the update efficiency of the global information, and avoiding the problem that the global system services are unavailable for a significant amount of time during updating.

In one embodiment, before step 501, the method may further include the following steps: adding a stop-write identification for updated global information in the global information and generating transitional global information and corresponding transitional version information.

In one embodiment, the global information update management control device may add the stop-write identification for the updated global information in the global information. The stop-write identification is used to suspend services related to the global information. The global information update management control device may push the transitional version of global information and the corresponding transitional version information to the global information server, and the application server may acquire the transitional version information by subscribing, update the historical version information by using the transitional version information, and return the update confirmation notice to the global information server.

When the global information is the routing table, the stop-write identification is used to suspend an operation of the user that may cause global data inconsistency such as writing data into the IDC to which the user actually belongs or originally belongs. The global information update management control device pushes the transitional version of global information and corresponding transitional version information to the global information server, the global information server sends them to the application server and, after acquiring the transitional version information, the application server may immediately continue serving the users.

Figure 9:
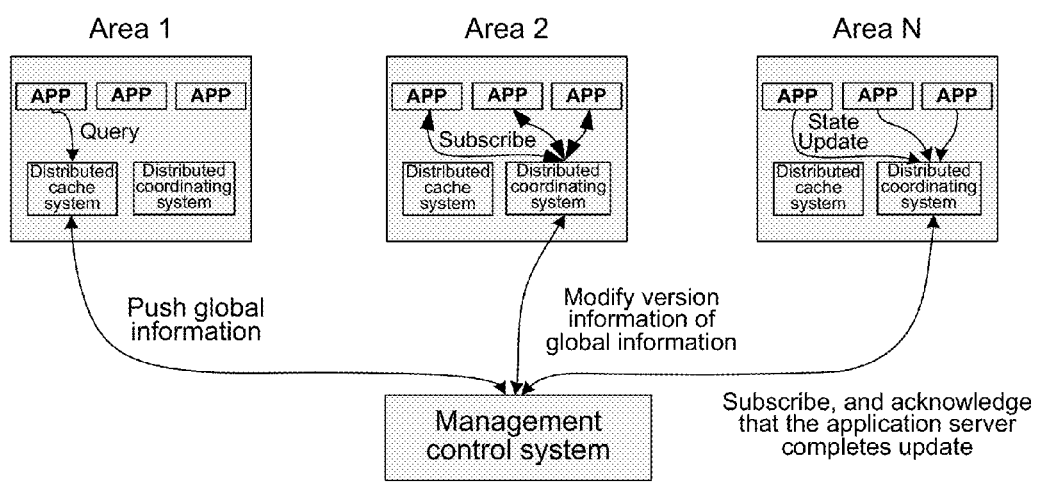
FIG. 9 is a diagram of a global information update process, according to some embodiments of the disclosure.

FIG. 9 is a diagram of a global information update process, according to some embodiments of the disclosure.

As illustrated in FIG. 9, a cross-regional e-commerce platform may be provided with an MCS and the MCS may be responsible for coordinating global information update processes in multiple regions. Each region may be provided with a global information server including a global information cache system and a version information management system. Each global information server may be responsible for updating version information of multiple application servers and serving acquiring requests thereof for routing data. The MCS pushes the new version of global information to the global information cache system of the global information server, and modifies the version information of the global information at the version information management system. The application server subscribes to the version information in the version information management system in the global information server, thereby sensing the modification of the MCS on the version information. After updating the version information thereof, the application server returns an update confirmation notice to the version information management system of the global information server. The MCS acknowledges, by subscribing to the version information management system, that the update of the version information of the application server is completed.

It should be noted that, for ease of description, the above embodiment is described as a series of steps, however, the embodiments of the disclosure are not limited to the order of action described herein, and some steps may be performed in other orders or simultaneously according to alternative embodiments of the disclosure. Additionally, the embodiments described in the specification are presented as examples, and the steps involved therein may not all be necessary for other embodiments of the disclosure.

Figure 6:
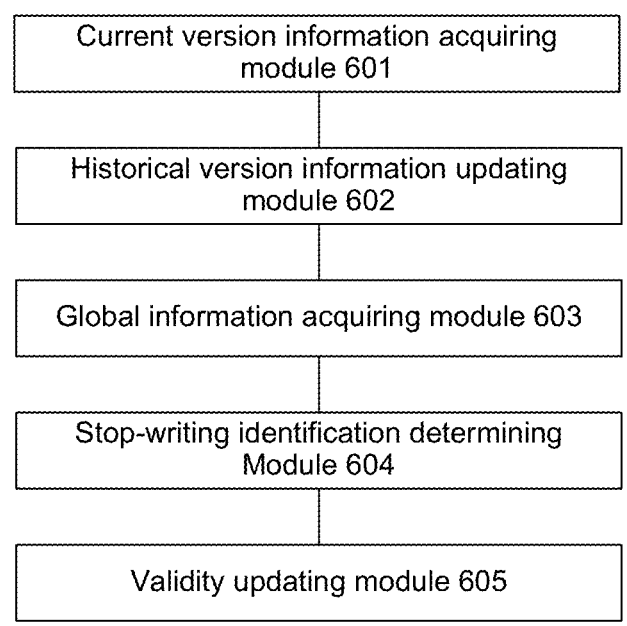
FIG. 6 is a block diagram of a global information acquiring device, according to some embodiments of the disclosure.

FIG. 6 is a block diagram of a global information acquiring device, according to some embodiments of the disclosure. In one embodiment, the device may be implemented on or as an application server. As illustrated in FIG. 6, the device includes the following modules:

a current version information acquiring module 601, configured for acquiring current version information of global information from a global information server;

a historical version information updating module 602, configured for correspondingly updating historical version information according to the acquired version information and returning an update confirmation notice to the global information server;

a global information acquiring module 603, configured for acquiring corresponding global information from the global information server according to the updated version information;

a stop-write identification judging module 604, configured for judging whether the acquired global information includes a stop-write identification, and if so, suspending a service provided for the global information; and a validity updating module 605, configured for updating a period of validity of historical version information according to a communication status between the application server and the global information server.

In one embodiment, the version information includes transitional version information, and the global information acquiring module 603 may include a transitional global information acquiring sub-module, configured for acquiring corresponding global information from the global information server according to updated transitional version information.

In one embodiment, the device may further include a version information subscribing module, configured for subscribing to version information of global information in the global information server.

In one embodiment, the current version information acquiring module 601 may include a current version information downloading sub-module, configured for downloading the current version information of the global information from the global information server when receiving a version information update notification sent by the global information server.

In one embodiment, the validity updating module 605 may include the following sub-modules:

a first communication status confirmation information sending sub-module, configured for sending confirmation information of a first communication status to the global information server regularly;

a validity resetting sub-module, configured for resetting the validity of the current version information when receiving confirmation information of a second communication status returned by the global information server within a preset period of time; and a version information invalidity determining sub-module, configured for determining that the current version information is invalid and suspending the service provided for the global information when confirmation information of a second communication status returned by the global information server is not received within a preset period of time.

Compared with the current application server acquiring a piece of complete global information having a large amount of data and correspondingly returning an update confirmation notice, the application server in some embodiments may return an update confirmation notice after acquiring version information having a smaller amount of data, and acquire corresponding global information from the global information server according to the updated version information. The global information server separately receives global information of various versions pushed by the global information update management control device. By decoupling the global information from a version information update process, and even though there are differences between various conditions such as network links and physical distances, the differences in time consumed by the application servers to acquire the version information are relatively small; therefore, an update of the global version information may be implemented within a short period of time.

At the same time, by introducing the transitional global information and the corresponding transitional version information, global system unavailability is greatly compressed, and the update efficiency of the global information is greatly improved, thereby avoiding the problem that the service of the global system is unavailable for a significant amount of time during updating.

Moreover, a confirmation of a communication status is maintained between the application server and the global information server, and the application server is stopped from providing service when the communication status is abnormal, thereby avoiding the situation that the application server uses expired global information to cause inconsistency in global data.

Figure 7:
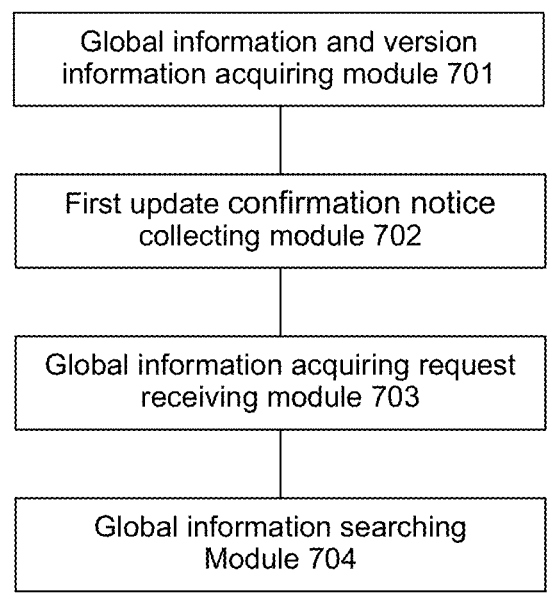
FIG. 7 is a block diagram of a global information processing device, according to some embodiments of the disclosure.

FIG. 7 is a block diagram of a global information processing device, according to some embodiments of the disclosure. In one embodiment, the device illustrated in FIG. 7 may be implemented on or as a global information server. The device may include the following modules:

a global information and version information acquiring module 701, configured for acquiring global information and corresponding version information from a global information update management control device, and sending the version information to the application server;

a first update confirmation notice collecting module 702, configured for collecting an update confirmation notice returned by the application server;

a global information acquiring request receiving module 703, configured for receiving a global information acquiring request submitted by the application server; and a global information searching module 704, configured for searching, in the global information corresponding to version information included in the global information acquiring request, for global information requested by the application server, and returning the global information to the application server.

The application server in some embodiments may return an update confirmation notice after acquiring version information having a smaller amount of data, and acquire corresponding global information from the global information server according to the updated version information. By decoupling the global information from the version information, even with the differences between various conditions such as network links and physical distances, a time difference of application servers acquiring the version information is relatively small; and therefore, an update of the global version information may be implemented within a short time period, thereby improving the update efficiency of the global information, and avoiding the problem that the global system services are unavailable for a significant amount of time during updating.

Figure 8:
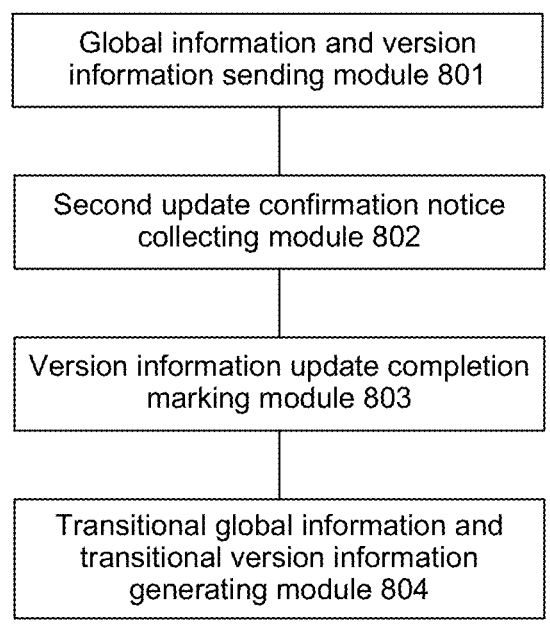
FIG. 8 is a block diagram of a global information updating device, according to some embodiments of the disclosure.

FIG. 8 is a block diagram of a global information updating device, according to some embodiments of the disclosure. In one embodiment, the device may be implemented on or as a global information update management control device. The device may include the following modules:

a global information and version information sending module 801, configured for sending global information and corresponding version information to a global information server;

a second update confirmation notice collecting module 802, configured for collecting, by using the global information server, an update confirmation notice returned by the application server after acquiring the version information; and a version information update completion marking module 803, configured for marking an update of version information of all current application servers as completed when update confirmation notices returned by all application servers are collected.

In one embodiment, the device may further include a transitional global information and transitional version information generating module 804, configured for adding a stop-write identification for updated global information in the global information, and generating transitional global information and corresponding transitional version information.

In one embodiment, the global information and version information sending module 801 may include a transitional global information and transitional version information sending sub-module, configured for sending the transitional global information and the transitional version information to the global information server.

In one embodiment, the global information and version information sending module 801 may include a global information and corresponding version information sending sub-module, configured for sending the global information and the corresponding version information to a global information cache system and a version information management system of the global information server.

The application server in some embodiments may return an update confirmation notice after acquiring version information having a smaller amount of data, and acquire corresponding global information from the global information server according to the updated version information. By decoupling the global information from the version information, even with the differences between various conditions such as network links and physical distances, a time difference of application servers acquiring the version information is relatively small; and therefore, an update of the global version information may be implemented within a short time period, thereby improving the update efficiency of the global information, avoiding the problem that the global system services are unavailable for a significant amount of time during updating.

Figure 13:
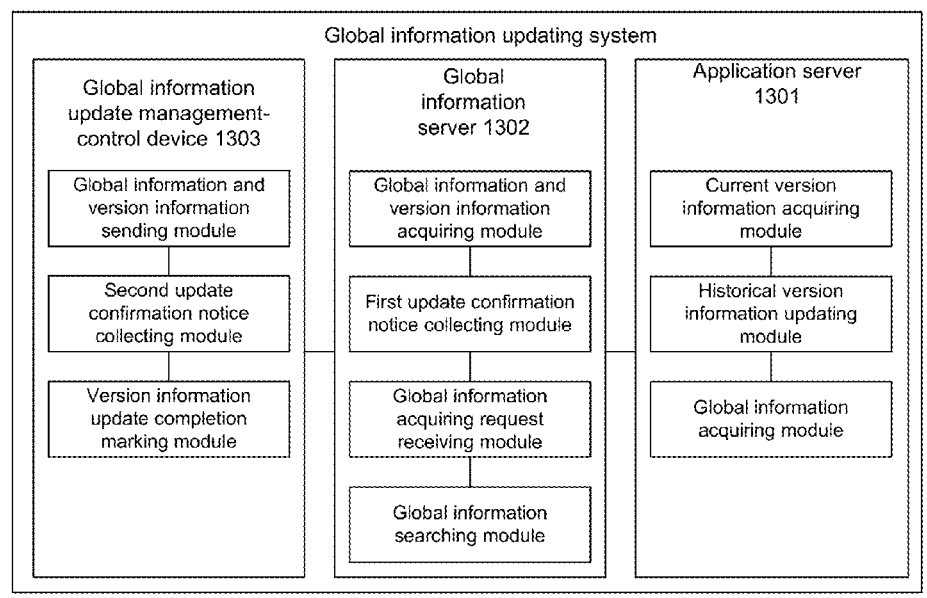
FIG. 13 is a block diagram of a global information updating system, according to some embodiments of the disclosure.

FIG. 13 is a block diagram of a global information updating system, according to some embodiments of the disclosure. The system may specifically include an application server 1301, a global information server 1302, and a global information update management control device 1303.

The application server 1301 may include the following modules:

a current version information acquiring module, configured for acquiring current version information of global information from the global information server;

a historical version information updating module, configured for correspondingly updating historical version information according to the acquired version information, and returning an update confirmation notice to the global information server; and a global information acquiring module, configured for acquiring corresponding global information from the global information server according to the updated version information.

The global information server 1302 may include the following modules:

a global information and version information acquiring module, configured for acquiring global information and corresponding version information from the global information update management control device, and sending the version information to the application server;

a first update confirmation notice collecting module, configured for collecting an update confirmation notice returned by the application server;

a global information acquiring request receiving module, configured for receiving a global information acquiring request submitted by the application server; and a global information searching module, configured for searching, in the global information corresponding to version information included in the global information acquiring request, for global information requested by the application server, and returning the global information to the application server.

The global information update management control device 1303 may include the following modules:

a global information and version information sending module, configured for sending global information and corresponding version information to the global information server;

a second update confirmation notice collecting module, configured for collecting an update confirmation notice returned by the application server after acquiring the version information through the global information server; and a version information update completion marking module, configured for marking an update of version information of all current application servers as completed when update confirmation notices returned by all the application servers are collected.

In the global information update system according to the embodiments of the disclosure, the application server may return an update confirmation notice after acquiring version information having a smaller amount of data, and acquire corresponding global information from the global information server according to the updated version information. The global information server separately receives global information of various versions pushed by the global information update management control device. By decoupling the global information from a version information update process, and even though there are differences between various conditions such as network links and physical distances, the differences in time consumed by the application servers to acquire the version information are relatively small; therefore, an update of the global version information may be implemented within a short period of time.

Figure 14:
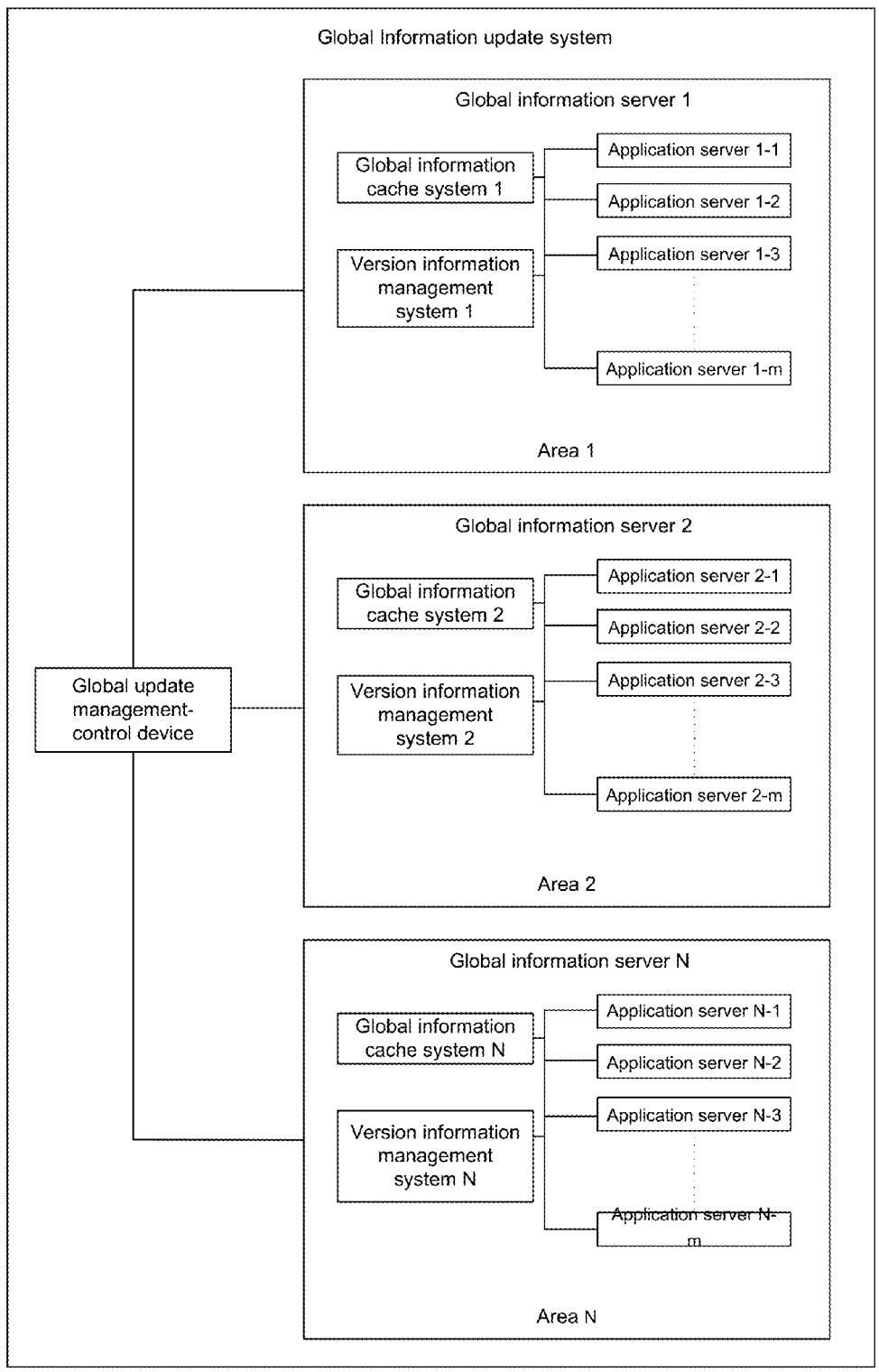
FIG. 14 is an architectural diagram of a global information updating system, according to some embodiments of the disclosure.

FIG. 14 is an architectural diagram of a global information updating system, according to some embodiments of the disclosure.

As illustrated in FIG. 14, the global information update system architecture includes a global information update management control device responsible for coordinating update processes of global information in multiple regions. The global information update management control device initially pushes updated global information and corresponding version information to global information servers in multiple regions, or pushes the updated global information to the global information servers in multiple regions, and then correspondingly modifies version information of the global information servers.

The global information server may be deployed in a region of the application server. The global information server may be respectively provided with a global information cache system and a version information management system. The global information cache system may cache global information of various versions pushed by the global information update management control device. The version information management system may cache version information of the global information of various versions pushed by the global information update management control device, or the version information management system may receive modifications of the global information update management control device on the version information stored therein; moreover, the version information management system is responsible for coordinating the version information update process of the global information of various application servers in the region, so as to maintain data consistency of the global information.

The application server may be application servers corresponding to various types of application programs, in which new version information of the global information is subscribed to from the version information management system of the global information server in the region, so as to sense the new version information pushed by the global information update management control device to the global information server or modification on the version information, and acquire the new version information of the global information from the global information server.

The embodiments of this specification are all described in a progressive manner, each embodiment emphasizes a difference between it and other embodiments, and identical or similar parts in the embodiments may be obtained with reference to each other.

Persons skilled in the art should understand that, the embodiments of the embodiments of the disclosure may be provided as a method, a device, or a computer program product. Therefore, the embodiments of the disclosure may be implemented entirely as a hardware embodiment, entirely as a software embodiment, or an embodiment combining software and hardware. Moreover, the embodiments of the disclosure may be a computer program product implemented on one or more computer usable storage media (including, but not limited to, a magnetic disk memory, a CD-ROM, an optical memory, and the like) containing computer usable program codes.

In a typical configuration, the computer device includes one or more processors (CPU), an input/output interface, a network interface, and a memory. The memory may include a volatile memory, a random access memory (RAM) and/or a non-volatile memory or the like in a computer readable medium, for example, a read only memory (ROM) or a flash RAM. The memory is an example of the computer readable medium. The computer readable medium includes non-volatile and volatile media as well as movable and non-movable media, and can implement information storage by means of any method or technology. Information may be a computer readable instruction, a data structure, and a module of a program or other data. A computer storage medium includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission medium, and can be used to store information accessed by the computing device. According to the definition of this text, the computer readable medium does not include transitory media, such as a modulated data signal and a carrier.

The embodiments of the disclosure are described with reference to flow diagrams and/or block diagrams according to the method, terminal device (system) and computer program product according to the embodiments of the disclosure. It should be understood that a computer program instruction may be used to implement each process and/or block in the flow diagrams and/or block diagrams and combinations of processes and/or blocks in the flow diagrams and/or block diagrams. The computer program instructions may be provided on a universal computer, a dedicated computer, an embedded processor or another programmable data processing terminal device to generate a machine, such that the computer or a processor of another programmable data processing terminal device executes an instruction to generate a device configured to implement functions designated in one or more processes in a flow diagram and/or one or more blocks in a block diagram.

The computer program instructions may also be stored in a computer readable storage working in a specific manner in a computer or another programmable data processing terminal device, such that the instruction stored in the computer readable storage generates manufactured goods including an instruction device, wherein the instruction device implements functions designated by one or more processes in a flow diagram and/or one or more blocks in a block diagram.

The computer program instructions may also be installed in a computer or another programmable data processing terminal device, such that a series of operation steps are executed on the computer or another programmable terminal device to generate a computer implemented processing, and therefore, the instruction executed in the computer or another programmable terminal device provides steps for implementing functions designated in one or more processes in a flow diagram and/or one or more blocks in a block diagram.

Preferred embodiments of the embodiments of the disclosure have been described; however, once they know the basic creative concepts, persons skilled in the art can make other variations and modifications on the embodiments. Therefore, the accompanying claims are intended to be explained as including the preferred embodiments and all variations and modifications falling within the scope of the embodiments of the disclosure.

Finally, it should be further noted that, in this text, the relation terms such as first and second are merely used to distinguish one entity or operation with other entities or operations, and do not require or imply that the entities or operations have this actual relation or order. Moreover, the term "include", "comprise" or other variations thereof are intended to cover a non-exclusive including, so that a process, method, product or terminal device including a series of elements not only includes the elements, but also includes other elements not clearly listed, or further includes inherent elements of the process, method, product or terminal device. In a case without any more limitations, an element defined by "including a . . . " does not exclude that the processes, methods, goods or terminal devices including the element further has other identical elements.

A global information acquiring method and device, a global information processing method and device and a global information updating method and device provided in the disclosure are described in detail, and the principles and implementation manners of the disclosure are described by applying specific examples in this text. The above descriptions on the embodiments are merely used to help understand the method of the disclosure and core ideas thereof; meanwhile, for persons of ordinary skill in the art, there may be modifications on the specific implementation manners and application scopes according to the idea of the disclosure; therefore, the content of the specification should not be construed as limiting the disclosure.

What is claimed is:

1. A method comprising:
    storing, by a server, historical version information associated with global information, the historical version information identifying a first state of the global information at a first time;
    responding, by the server, to a network request received from a client device using the global information;
    retrieving, by the server, current version information associated with the global information from a global information server, the current version information identifying a second state of the global information at a second time;
    generating, by the server, updated historical version information based on the current version information;
    transmitting, by the server, an update confirmation notice to the global information server;
    retrieving, by the server, updated global information from the global information server based on the updated historical version information; and
    responding, by the server, to a second network request received from the client device using the updated global information.

2. The method of claim 1 wherein the current version information comprises transitional version information and wherein the method further comprises:
    determining, by the server, whether the updated global information includes a stop-write identification; and
    suspending, by the server, a network service associated with the global information if the global information includes a stop-write identification.

3. The method of claim 1 wherein the historical version information includes a period of validity and wherein the method further comprises updating, by the server, the period of validity in response to a communication status received from the global information server.

4. The method of claim 3 wherein updating the period of validity in response to a communication status received from the global information server further comprises:
    transmitting, by the server, a first communication status confirmation to the global information server;
    resetting, by the server, the period of validity upon receiving a second confirmation status from the global information server within a predefined interval; and
    suspending, by the server, a network service associated with the global information upon determining that the current version information is invalid if the second confirmation status is not received within the predefined interval.

5. The method of claim 1 wherein retrieving current version information from the global information server comprises retrieving current version information from the global information server located in the same region as the server.

6. The method of claim 1 further comprising:
    subscribing, by the server, to the current version information at the global information server prior to acquiring the current version information from the global information server; and
    retrieving, by the server, updated global information from the global information server in response to a version update notification received from the global information server.

7. The method of claim 1 wherein retrieving updated global information further comprises transmitting, by the server, a global information acquiring request to the global information server prior to retrieving the updated global information.

8. The method of claim 1 further comprising marking, by the global information server, an update to the global information as complete upon receiving the update confirmation notice.

9. The method of claim 1 wherein the current version information is associated with a subset of the global information.

10. An apparatus comprising:
    a processor; and
    a non-transitory memory storing computer-executable instructions therein that, when executed by the processor, cause the apparatus to:
        store historical version information associated with global information, the historical version information identifying a first state of the global information at a first time;
        respond to a network request received from a client device using the global information;
        retrieve current version information associated with the global information from a global information server, the current version information identifying a second state of the global information at a second time;
        generate updated historical version information based on the current version information;
        transmit an update confirmation notice to the global information server;
        retrieve updated global information from the global information server based on the updated historical version information; and
        respond to a second network request received from the client device using the updated global information.

11. The apparatus of claim 10 wherein the current version information comprises transitional version information and wherein the instructions further cause the apparatus to:
    determine whether the updated global information includes a stop-write identification; and
    suspend a network service associated with the global information if the global information includes a stop-write identification.

12. The apparatus of claim 10 wherein the historical version information includes a period of validity and wherein the instructions further cause the apparatus to update the period of validity in response to a communication status received from the global information server.

13. The apparatus of claim 12 wherein the instructions causing the apparatus to update the period of validity in response to a communication status received from the global information server further include instructions causing the apparatus to:
   transmit a first communication status confirmation to the global information server;
   reset the period of validity upon receiving a second confirmation status from the global information server within a predefined interval; and
   suspend a network service associated with the global information upon determining that the current version information is invalid if the second confirmation status is not received within the predefined interval.

14. The apparatus of claim 10 wherein the instructions causing the apparatus to retrieve current version information from the global information server includes instructions causing the apparatus to retrieve current version information from the global information server located in the same region as the server.

15. The apparatus of claim 10 wherein the instructions further include instructions causing the apparatus to:
   subscribe to the current version information at the global information server prior to acquiring the current version information from the global information server; and
   retrieve updated global information from the global information server in response to a version update notification received from the global information server.

16. The apparatus of claim 10 wherein the instructions causing the apparatus to retrieve updated global information further include instructions causing the apparatus to transmit a global information acquiring request to the global information server prior to retrieving the updated global information.

17. The apparatus of claim 10 wherein the instructions further cause the apparatus to mark an update to the global information as complete upon receiving the update confirmation notice.

18. The apparatus of claim 10 wherein the current version information is associated with a subset of the global information.

19. A system comprising:
a global information server, used for:
   storing global information and version information associated with the global information,
   transmitting the version information to one or more application servers,
   receiving an update confirmation notice from the one or more application servers,
   receiving a global information acquiring request from the one or more application servers, the global information acquiring request including version information,
   transmitting global information to the one or more application servers in response to the global information acquiring request; and
an application server, used for:
   storing historical version information associated with the global information, the historical version information identifying a first state of the global information at a first time,
   responding to a network request received from a client device using the global information;
   retrieving current version information associated with the global information from the global information server, the current version information identifying a second state of the global information at a second time,
   generating updated historical version information based on the current version information,
   transmitting an update confirmation notice to the global information server,
   retrieving updated global information from the global information server based on the updated historical version information, and
   responding to a second network request received from the client device using the updated global information.

20. The system of claim 19 further comprising a global information update management control device, used for sending global information and version information associated with the global information to the global information server.

* * * * *